(12) United States Patent
Li et al.

(10) Patent No.: US 11,648,813 B2
(45) Date of Patent: May 16, 2023

(54) ALL-TERRAIN VEHICLE

(71) Applicant: SEGWAY TECHNOLOGY CO., LTD., Jiangsu (CN)

(72) Inventors: Xiang Li, Jiangsu (CN); Mingtang Chen, Jiangsu (CN)

(73) Assignee: SEGWAY TECHNOLOGY CO., LTD., Jiangsu (CN)

( * ) Notice: Subject to any disclaimer, the term of this patent is extended or adjusted under 35 U.S.C. 154(b) by 137 days.

(21) Appl. No.: 17/327,908

(22) Filed: May 24, 2021

(65) Prior Publication Data
US 2021/0362558 A1    Nov. 25, 2021

(30) Foreign Application Priority Data

May 22, 2020    (CN) .......................... 202020886297.7

(51) Int. Cl.
*B60G 21/055*    (2006.01)
*B60G 3/20*    (2006.01)
(Continued)

(52) U.S. Cl.
CPC ........... *B60G 21/0551* (2013.01); *B60G 3/20* (2013.01); *B60G 7/001* (2013.01); *B60G 7/04* (2013.01);
(Continued)

(58) Field of Classification Search
CPC ...... B60G 21/0551; B60G 3/20; B60G 7/001; B60G 7/04; B60G 2204/143;
(Continued)

(56) References Cited

U.S. PATENT DOCUMENTS 4,083,580 A * 4/1978 Shaner .................. B60G 11/20
267/276
5,013,166 A * 5/1991 Domer ............... B60G 21/0551
384/220
(Continued)

FOREIGN PATENT DOCUMENTS

CN    210309819    † 4/2020
EP    3912836 A1    11/2021
(Continued)

OTHER PUBLICATIONS

Canadian Intellectual Property Office, Office Action for CA application 3,119,473, dated Aug. 22, 2022.
(Continued)

*Primary Examiner* — Paul N Dickson
*Assistant Examiner* — Timothy Wilhelm
(74) *Attorney, Agent, or Firm* — Timothy W. Menasco, Esq.; Harter Secrest & Emery LLP

(57) ABSTRACT

The present disclosure discloses an all-terrain vehicle which includes: a frame, a left-front suspension assembly connected with a left side of the frame and including a left-upper rocker arm and a left-lower rocker arm, the left-upper rocker arm is located above the left-lower rocker arm; a right-front suspension assembly connected with a right side of the frame and including a right-upper rocker arm and a right-lower rocker arm, the right-upper rocker arm is located above the right-lower rocker arm; a lateral stabilizer bar mounted on the frame and arranged above the left-upper rocker arm and the right-upper rocker arm, and a steering gear mounted on the frame and located below the lateral stabilizer bar.

17 Claims, 2 Drawing Sheets

(51) Int. Cl.
*B60G 7/00* (2006.01)
*B60G 7/04* (2006.01)
(52) U.S. Cl.
CPC ............... *B60G 2204/143* (2013.01); *B60G 2204/4502* (2013.01); *B60G 2204/82* (2013.01); *B60G 2204/8302* (2013.01); *B60G 2206/124* (2013.01); *B60G 2300/07* (2013.01)
(58) Field of Classification Search
CPC ........ B60G 2204/4502; B60G 2204/82; B60G 2204/8302; B60G 2206/124; B60G 2300/07; B60G 2202/135; B60G 2204/1222; B60G 2300/124; B60G 2300/13; B60G 21/055
See application file for complete search history.

(56) References Cited

U.S. PATENT DOCUMENTS

| | | | | |
|---|---|---|---|---|
| 5,352,044 | A * | 10/1994 | Jordens | F16C 11/04 384/295 |
| 7,025,344 | B2 * | 4/2006 | Kammel | F16F 1/16 267/293 |
| 7,114,712 | B2 * | 10/2006 | Lewis | B60G 21/0551 267/152 |
| 7,258,192 | B2 * | 8/2007 | Davis | B60G 21/0551 180/312 |
| 8,505,938 | B2 * | 8/2013 | King | B60G 3/20 280/124.152 |
| 8,882,092 | B2 * | 11/2014 | Jang | B60G 21/0551 267/141 |
| 8,888,082 | B2 * | 11/2014 | Kang | B60G 21/0551 267/141 |
| 9,546,705 | B2 * | 1/2017 | Ishimatsu | F16F 1/3835 |
| 9,718,351 | B2 * | 8/2017 | Ripley | B60K 17/08 |
| 9,937,762 | B2 * | 4/2018 | Sunahiro | B60G 11/20 |
| 9,981,519 | B2 * | 5/2018 | Despres-Nadeau | B60N 2/38 |
| 9,981,524 | B2 * | 5/2018 | Matsumura | F16F 1/3821 |
| 10,442,264 | B2 * | 10/2019 | Mailhot | B60G 7/008 |
| 10,661,628 | B2 * | 5/2020 | Hinders | B60G 3/202 |
| 10,753,417 | B2 * | 8/2020 | Akiyama | F16F 1/3842 |
| 11,014,419 | B2 * | 5/2021 | Danielson | B60K 13/04 |
| 2008/0023240 | A1 † | 1/2008 | Sunsdahl | |
| 2012/0193163 | A1 † | 8/2012 | Wimpfheimer | |
| 2014/0376989 | A1 | 12/2014 | Nachbar et al. | |
| 2015/0061275 | A1 | 3/2015 | Deckard et al. | |
| 2016/0347137 | A1 † | 12/2016 | Despres-Nadeau | |
| 2016/0347350 | A1 † | 12/2016 | Heon | |
| 2018/0215220 | A1 * | 8/2018 | Mailhot | B62D 7/18 |
| 2021/0300141 | A1 * | 9/2021 | De Grammont | B60G 21/0551 |
| 2021/0362558 | A1 | 11/2021 | Li et al. | |

FOREIGN PATENT DOCUMENTS

| | | |
|---|---|---|
| WO | 2015088459 A1 | 6/2015 |
| WO | 2015114607 A1 | 8/2015 |
| WO | 2018118176 A1 | 6/2018 |

OTHER PUBLICATIONS

European Patent Office, Search Report for EP application 21175493.2, dated Sep. 29, 2021.
European Patent Office, Office Action for EP application 21175493.2, dated Nov. 14, 2022.

\* cited by examiner
† cited by third party

ALL-TERRAIN VEHICLE

CROSS-REFERENCE TO RELATED APPLICATIONS

This application is based upon and claims priority to Chinese Patent Application Serial No. 202020886297.7, filed on May 22, 2020, the entire content of which is incorporated herein by reference.

TECHNICAL FIELD

The present disclosure relates to a technical field of all-terrain vehicles, and more particularly to an all-terrain vehicle.

BACKGROUND

In a related art, all off-road all-terrain vehicles adopt front and rear independent suspensions to meet drivability of vehicles under different road conditions. Double-wishbone type independent suspension has an excellent comprehensive performance and may meet requirement of long working stroke of wheels, thereby being widely used in a field of the off-road all-terrain vehicles.

However, the independent suspensions with relatively long working strokes have low roll stiffness, which affects the running stability. Therefore, lateral stabilizer bars need to be adopted for the front and rear independent suspensions to improve lateral stability of the vehicles during driving. However, the double-wishbone type independent suspension occupies more space than other suspension, such as McPherson suspension, and in particular, space for the front suspension system is small, thereby resulting in no space for the front lateral stabilizer bar in some vehicle models on the market. Moreover, disassembly for the vehicle with front lateral stabilizer bar assembly and maintenance are inconvenient.

SUMMARY

The present disclosure aims at solving at least one of the technical problems existing in the prior art. To this end, one purpose of the present disclosure is to provide an all-terrain vehicle mounted with a lateral stabilizer bar at a front side of the all-terrain vehicle, which has good lateral stability.

An all-terrain vehicle according to the present disclosure including a frame, a left-front suspension assembly connected with a left side of the frame and including a left-upper rocker arm and a left-lower rocker arm, the left-upper rocker arm being located above the left-lower rocker arm, a right-front suspension assembly connected with a right side of the frame and including a right-upper rocker arm and a right-lower rocker arm, the right-upper rocker arm being located above the right-lower rocker arm, a lateral stabilizer bar mounted on the frame and arranged above the left-upper rocker arm and the right-upper rocker arm, and a steering gear mounted on the frame and located below the lateral stabilizer bar.

Thus, through mounting the lateral stabilizer bar among rocker arm assemblies and a front vertical beam, the all-terrain vehicle according to the present disclosure may solve the problem that the mounting space is insufficient for the lateral stabilizer bar, thereby better ensuring the lateral stability of the all-terrain vehicle due to the existence of the lateral stabilizer bar without affecting the mounting and use of the steering gear.

BRIEF DESCRIPTION OF THE DRAWINGS

These and other aspects and advantages of embodiments of the present disclosure will become apparent and readily appreciated from the following descriptions made with reference to the drawings, wherein.

DETAILED DESCRIPTION

Embodiments of the present disclosure are described in detail below. The embodiments described with reference to the drawings are exemplary, and the following describes the embodiments of the present disclosure in detail.

An all-terrain vehicle according to the embodiments of the present disclosure will be described below with reference to FIGS. 1-3. The all-terrain vehicle may be, but is not limited to, an off-road all-terrain vehicle.

Figure 1:
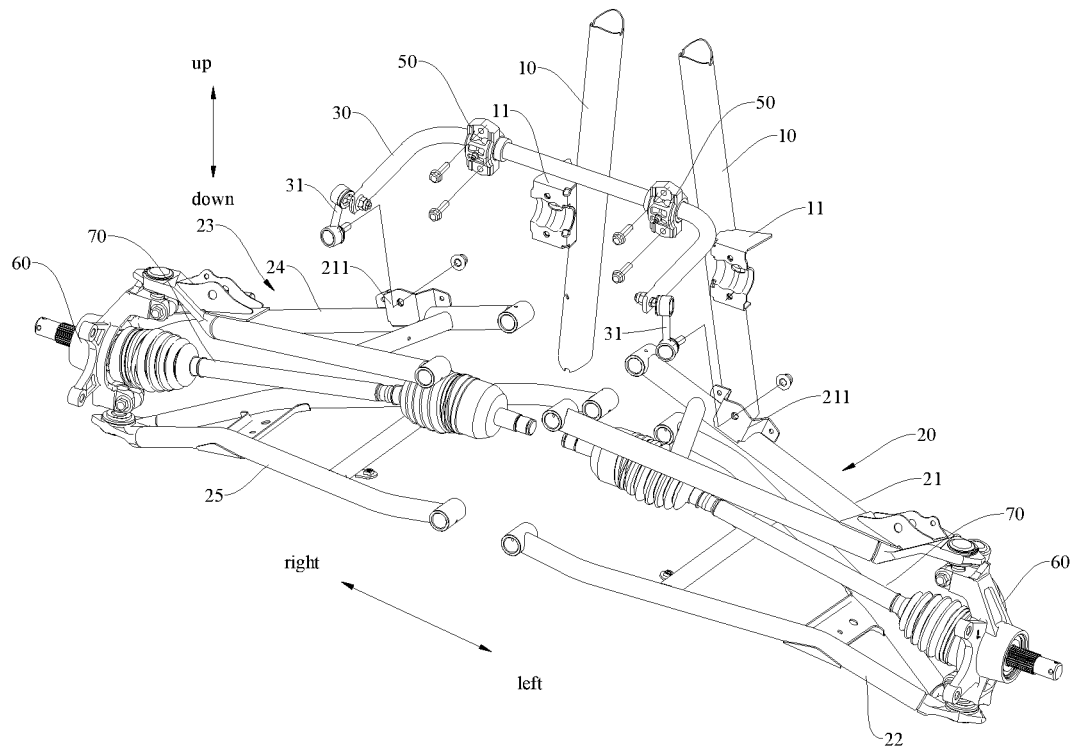
FIG. 1 is a structural view of a front portion of an all-terrain vehicle according to an embodiment of the present disclosure.
Figure 2:
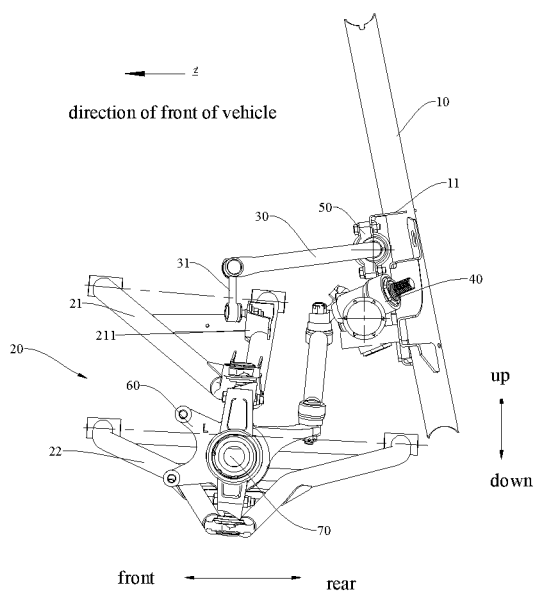
FIG. 2 is a side view of the front portion of the all-terrain vehicle illustrated in FIG. 1.

As illustrated in FIGS. 1 and 2, the all-terrain vehicle according to the embodiments of the present disclosure includes a frame, a left-front suspension assembly 20, a right-front suspension assembly 23, a lateral stabilizer bar 30, and a steering gear 40, and the left-front suspension assembly 20, the right-front suspension assembly 23, the lateral stabilizer bar 30, and the steering gear 40 are all mounted on the frame.

As illustrated in FIG. 1, the frame includes a front rocker arm mounting bracket (not illustrated) and a front vertical beam 10. The front rocker arm mounting bracket is mainly configured for mounting an inner end of the front rocker arm and arranged at a front side of the front vertical beam 10, and the front rocker arm mounting bracket may be an integral sheet-metal structure and mounted at the front side of the front vertical beam 10 in an integral form. For example, the front rocker arm mounting bracket may be integrally welded to the front side of the front vertical beam 10. The front rocker arm mounting frame arranged in this way has advantages of high structural strength, high structural reliability, and convenient mounting and fixation, and may reduce manufacturing difficulty of the frame. Certainly, the front rocker arm mounting bracket may also be composed of a plurality of beams or rods, i.e., a part of the beams or rods of the frame constitute the front rocker arm mounting bracket, and the rocker arm of the suspension assembly is mounted on the front rocker arm mounting bracket.

It should note that the rocker arms used herein are intended to refer to control arms of suspension systems of vehicles.

The left-front suspension assembly 20 and the right-front suspension assembly 23 are connected with the frame, the left-front suspension assembly 20 is connected with a left side of the frame, while the right-front suspension assembly 23 is connected with a right side of the frame, and the left-front suspension assembly 20 and the right-front suspension assembly 23 are arranged opposite to each other in a left-right direction. The left-front suspension assembly 20 includes a left-upper rocker arm 21 and a left-lower rocker arm 22, and the left-upper rocker arm 21 is located above the left-lower rocker arm 22. The right-front suspension assembly 23 includes a right-upper rocker arm 24 and a right-lower rocker arm 25, and the right-upper rocker arm 24 is located above the right-lower rocker arm 25. In other words, both the left-front suspension assembly 20 and the right-front suspension assembly 23 belong to the front suspension assembly, are arranged opposite to each other in the left-right direction, and may correspond to a left wheel and a right wheel at the front side of the all-terrain vehicle.

In some embodiments, a width of the left-upper rocker arm 21 in a front-rear direction of the all-terrain vehicle is less than that of the left-lower rocker arm 22 in the front-rear direction of the all-terrain vehicle, and a width of the right-upper rocker arm 24 in the front-rear direction of the all-terrain vehicle is less than that of the right-lower rocker arm 25 in the front-rear direction of the all-terrain vehicle.

As illustrated in FIGS. 1 and 2, the lateral stabilizer bar 30 is mounted on the frame and is arranged above the left-upper rocker arm 21 and the right-upper rocker arm 24. For example, the lateral stabilizer bar 30 is arranged behind and above the left-upper rocker arm 21 and the right-upper rocker arm 24. The lateral stabilizer bar 30 arranged in this way may solve the problem that mounting space is insufficient for the lateral stabilizer bar 30, thereby better ensuring the lateral stability of the all-terrain vehicle due to the existence of the lateral stabilizer bar 30.

Specifically, a middle portion of the lateral stabilizer bar 30 is mounted on the frame, for example, on the front vertical beam 10, and left end and the right end of the lateral stabilizer bar 30 are respectively connected with the left-upper rocker arm 21 and the right-upper rocker arm 24. The lateral stabilizer bar 30 arranged in this way may make better use of space behind and above the left-front suspension assembly 20 and the right-front suspension assembly 23, improve utilization ratio of the front suspension assembly in a front space of the frame, and further ensure mounting reliability of the lateral stabilizer bar among the frame and the two front suspension assemblies.

In addition, as illustrated in FIG. 2, the steering gear 40 is mounted on the frame and located below the lateral stabilizer bar 30. Specifically, the steering gear 40 may be mounted on the front vertical beam 10, such that both the steering gear 40 and the lateral stabilizer bar 30 are mounted on the front vertical beam 10 and arranged at intervals in an up-down direction. The lateral stabilizer bar 30 is mounted above the steering gear 40, so as to avoid affecting the mounting and fixation of the steering gear 40 and avoid interfering connection between the steering gear 40 and a steering rod, such that the lateral stabilizer bar 30 may reasonably utilize front space of the all-terrain vehicle. The lateral stabilizer bar 30 arranged in this way is stable in mounting and convenient in disassembly, and the left-front suspension assembly 20 and the right-front suspension assembly 23 may be disassembled after the lateral stabilizer bar 30 is disassembled.

Therefore, through mounting the lateral stabilizer bar 30 among the left-front suspension assembly 20, the right-front suspension assembly 23 and the front vertical beam 10, the all-terrain vehicle according to the embodiments of the present disclosure may solve the problem that the mounting space is insufficient for the lateral stabilizer bar 30, thereby better ensuring the lateral stability of the all-terrain vehicle due to the existence of the lateral stabilizer bar 30 without affecting the mounting and use of the steering gear 40.

Figure 3:
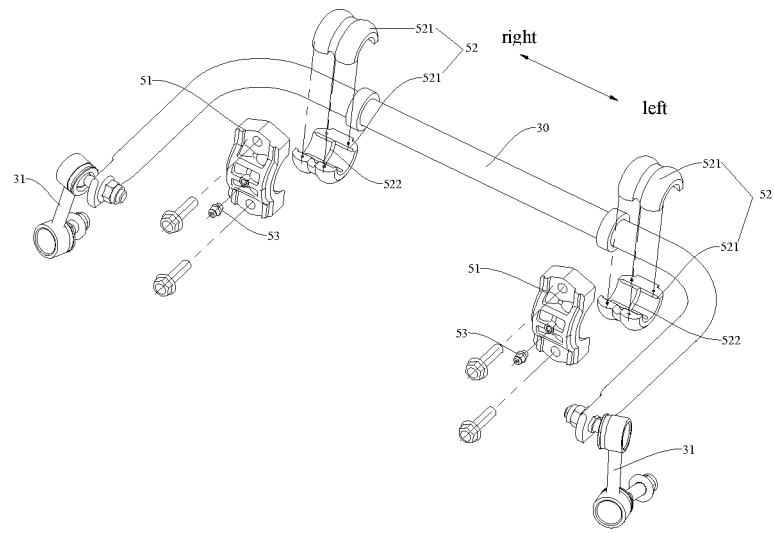
FIG. 3 is a schematic view of a lateral stabilizer bar and a mounting device.
Figure 4:
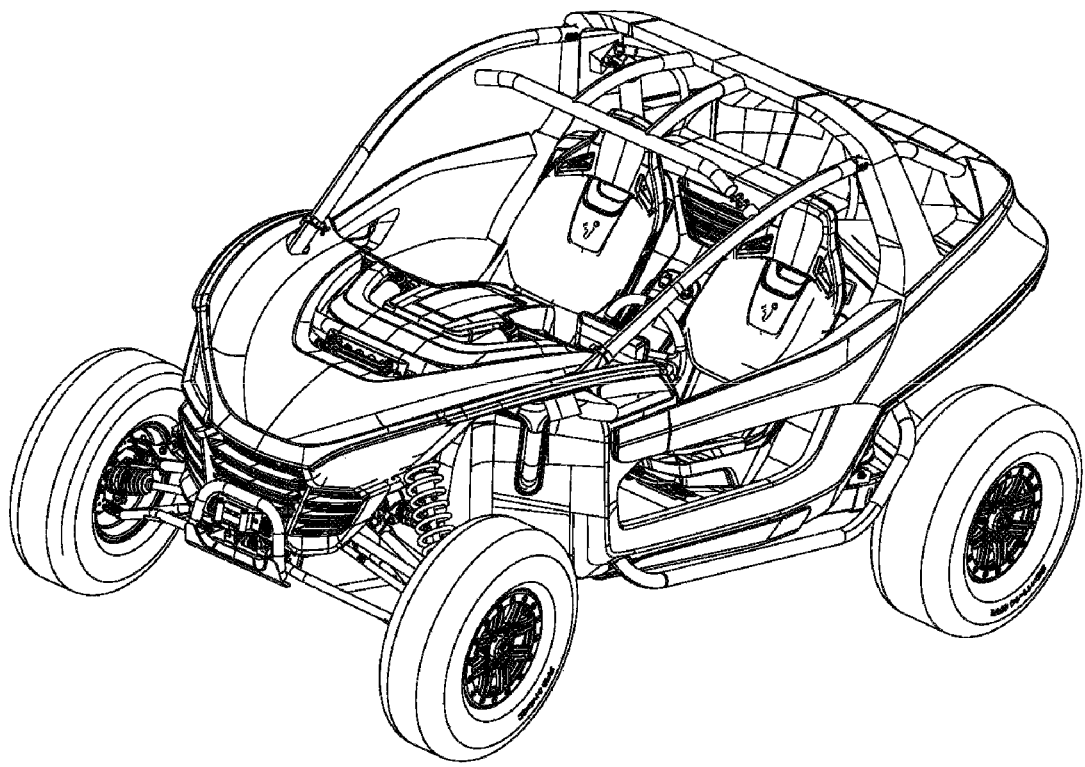
FIG. 4 is a perspective view of an all-terrain vehicle according to an embodiment of the present disclosure.

According to an embodiment of the present disclosure, as illustrated in FIGS. 1 and 3, two ends of the lateral stabilizer bar 30 are respectively provided with ball-pin connecting rods 31. One end of each ball-pin connecting rod 31 is connected with an end portion of the lateral stabilizer bar 30, and the other end of the ball-pin connecting rod 31 is connected with the corresponding upper rocker arm, i.e., the corresponding left-upper rocker arm 21 and right-upper rocker arm 24. The ball-pin connecting rods 31 is arranged to enable to allow the end portion of the lateral stabilizer bar 30 to move a certain amount relative to the upper rocker arm in space, thereby ensuring the working reliability of the lateral stabilizer bar 30 and the lateral stability of the all-terrain vehicle while ensuring the mounting reliability of the lateral stabilizer bar 30.

Further, as illustrated in FIGS. 1 and 3, each of the left-upper rocker arm 21 and the right-upper rocker arm 24 is a double wishbones A ball-pin bracket 211 is located behind the left-upper rocker arm 21 and the right-upper rocker arm 24. An upper end of the ball-pin connecting rod 31 may be directly and fixedly connected with the end portion of the lateral stabilizer bar 30 by fasteners, and a lower end of the ball-pin connecting rod 31 may be fixedly connected with the ball-pin bracket 211 by fasteners. The arrangement of the ball-pin bracket 211 may facilitate the mounting and fixation of the ball-pin connecting rod 31, such that the lateral stabilizer bar 30 may be mounted at the corresponding left-upper rocker arm 21 and right-upper rocker arm 24 more reliably and stably. The ball-pin bracket 211 may be welded to the corresponding left-upper rocker arm 21 and right-upper rocker arm 24, thereby ensuring the structural reliability of the ball-pin bracket 211.

According to a specific embodiment of the present disclosure, as illustrated in FIGS. 1-3, a mounting device 50 is arranged at the middle portion of the lateral stabilizer bar 30, a stabilizer bar bracket 11 is arranged on the front vertical beam 10 of the frame, and the mounting device 50 is mounted to the stabilizer bar bracket 11. The lateral stabilizer bar 30 is a U-shaped bar, and the mounting device 50 is arranged at a middle portion of a cross bar of the lateral stabilizer bar 30, and may play a role of mounting, thereby ensuring the mounting reliability between the lateral stabilizer bar 30 and the front vertical beam 10.

Further, as illustrated in FIG. 3, the mounting device 50 includes a mounting base 51 and a buffer sleeve 52 fitted over the middle portion of the cross bar of the lateral stabilizer bar 30, the mounting base 51 and the stabilizer bar bracket 11 are arranged opposite to each other, the mounting base 51 is fixed on the stabilizer bar bracket 11 by fasteners, and the mounting base 51 and the stabilizer bar bracket 11 jointly define a mounting space for the buffer sleeve 52. The mounting base 51 and the stabilizer bar bracket 11 may play a role of mounting, and the buffer sleeve 52 may play a role of buffering, thereby avoiding direct contact between the mounting base 51 and the lateral stabilizer bar 30, so as to ensure the structural stability of the lateral stabilizer bar 30, and also allow the lateral stabilizer bar 30 to move a certain amount relative to the buffer sleeve 52. A semicircular groove may be defined in the mounting base 51, a semicircular groove may be defined in the stabilizer bar bracket 11, and the two semicircular grooves jointly define a mounting space. The stabilizer bar bracket 11 may be welded onto the front vertical beam 10.

According to an embodiment of the present application, as illustrated in FIG. 3, the buffer sleeve 52 includes two semicircular buffer blocks 521 arranged opposite to each other, and end portions of the two buffer blocks 521 are inserted and fitted with each other. It may be understood that the two semicircular buffer blocks 521 may facilitate the buffer sleeve 52 to be fitted over a periphery of the middle portion of the lateral stabilizer bar 30, and the two buffer blocks 521 are fitted with each other conveniently and stably. Convex posts and grooves may be provided at end portions of the buffer blocks 521, the convex post of one buffer block 521 may be fitted in the groove of the other buffer block 521, to form certain fitting relationship and also ensure the fitting stability of the two buffer blocks 521. As illustrated in FIGS. 2 and 3, fitting end faces of the two buffer blocks 521 may be substantially in a horizontal direction, and fitting end faces between the mounting base 51 and the stabilizer bar bracket 11 may be substantially in a vertical direction, such that the two fitting end faces may be staggered, thereby avoiding the fitting end faces from separating due to poor contact between the fitting end faces of the two buffer blocks 521.

As illustrated in FIG. 3, an oil channel 522 is defined in the buffer sleeve 52. The arrangement of the oil channel 522 may allow lubricating grease to flow inside the oil channel, and the lubricating grease plays a role of lubricating between the lateral stabilizer bar 30 and the buffer sleeve 52, thereby reducing wear of the lateral stabilizer bar 30 and prolonging service life of the lateral stabilizer bar 30.

In addition, as illustrated in FIG. 3, a forced filling oil cup 53 is mounted at the mounting base 51 and is communicated with the oil channel 522. The forced filling oil cup 53 is a grease fitting. The arrangement of the forced filling oil cup 53 may allow a driver or maintenance personnel to inject the lubricating grease into the oil channel 522, such that the lubricating grease in the buffer sleeve 52 may be replenished after a certain amount of lubricating grease is consumed, thereby effectively protecting the lateral stabilizer bar 30 and prolonging the service life of the lateral stabilizer bar 30. Specifically, the forced filling oil cup 53 passes through a middle portion of the mounting base 51 and is communicated with the oil channel 522 in the buffer sleeve 52 after passing through the buffer sleeve 52.

As illustrated in FIG. 1, two front vertical beams 10 are provided. The middle portion of the lateral stabilizer bar 30 is mounted at the two front vertical beams 10. The arrangement of the two front vertical beams 10 may ensure the structural reliability of the frame and the mounting reliability of the steering gear 40. Since the middle portion of the lateral stabilizer bar 30 is mounted on the two front vertical beams 10, the stability of the lateral stabilizer bar 30 may be ensured.

The two front vertical beams 10 are not parallel in the up-down direction, and a distance between the two front vertical beams 10 gradually decreases from bottom to top.

The steering gear 40 is located below the middle portion of the lateral stabilizer bar 30. Specifically, the steering gear 40 may be mounted on one front vertical beam 10, such that the steering gear may be located below the lateral stabilizer bar 30, and the steering gear 40 and the lateral stabilizer bar may be arranged at intervals in the up-down direction, thereby ensuring the mounting stability of the lateral stabilizer bar 30.

In some embodiments, the steering gear 40 is located between the left-upper rocker arm 21 as well as the right-upper rocker arm 24 and the front vertical beam 10 in the front-rear direction of the all-terrain vehicle, and a projection of the steering gear 40 on a transverse central plane of the all-terrain vehicle coincides at least partially with a projection of the left-upper rocker arm 21 and the right-upper rocker arm 24 on the transverse central plane of the all-terrain vehicle.

In the description of the present disclosure, it should be understood that the terms "lateral", "upper", "lower", "front", "rear", "left", "right", "inner", "outer", "axial", "radial", "circumferential", etc. indicate the orientation or positional relationship based on the orientation or positional relationship illustrated in the drawings. These terms are merely for convenience of description and simplifying the description, rather than indicating or implying that referred device or element must have a specific orientation, be constructed and operated in a specific orientation, and therefore cannot be understood as a limitation of the present disclosure.

In the description of the present disclosure, "a plurality" means two or more than two. In the description of the present disclosure, the first feature "above" or "below" the second feature may be that the first feature and second feature are in direct contact, or the first feature and second feature not are in direct contact but in contact by additional features therebetween. In the description of the present disclosure, the first feature being "up", "above" and "on" the second feature may be that the first feature is directly above and obliquely above the second feature, or merely be that the first feature has a level higher than that of the second feature.

Reference throughout this specification to terms "one embodiment", "some embodiments"," exemplary embodiment", "an example", "a specific example", or "some examples", means that a particular feature, structure, material, or characteristic described in connection with the embodiment or example is included in at least one embodiment or example of the present disclosure. In this specification, exemplary descriptions of aforesaid terms are not necessarily referring to the same embodiment or example.

Although embodiments of the present disclosure have been illustrated and described above, it should be understood by those skilled in the art that changes, modifications, alternatives, and variations may be made in the embodiments without departing from spirit, principles and scope of the present disclosure. The scope of this disclosure is limited by the claims and their equivalents.

What is claimed is:

1. An all-terrain vehicle, comprising:
a frame,
a left-front suspension assembly connected with a left side of the frame and comprising a left-upper rocker arm and a left-lower rocker arm, the left-upper rocker arm being located above the left-lower rocker arm,
a right-front suspension assembly connected with a right side of the frame and comprising a right-upper rocker arm and a right-lower rocker arm, the right-upper rocker arm being located above the right-lower rocker arm,
a lateral stabilizer bar mounted on the frame and arranged above the left-upper rocker arm and the right-upper rocker arm, and
a steering gear mounted on the frame and located below the lateral stabilizer bar,
wherein a middle portion of the lateral stabilizer bar is mounted on the frame, one end of the lateral stabilizer bar is connected with the left-upper rocker arm, and the other end of the lateral stabilizer bar is connected with the right-upper rocker arm,
a mounting device is arranged at the middle portion of the lateral stabilizer bar, a stabilizer bar bracket is arranged on the frame, the mounting device comprises a mounting base and a buffer sleeve, the buffer sleeve is fitted over the middle portion of the lateral stabilizer bar, and the mounting base and the stabilizer bar bracket are arranged opposite to each other to jointly define a mounting space for the buffer sleeve, and an oil channel is defined in the buffer sleeve, and a forced filling oil cup is mounted at the mounting base and is communicated with the oil channel.

2. The all-terrain vehicle according to claim 1, wherein a first end of the lateral stabilizer bar and a second end of the lateral stabilizer bar are connected with the left-upper rocker arm and the right-upper rocker arm through ball-pin connecting rods, respectively.

3. The all-terrain vehicle according to claim 2, wherein each of the left-upper rocker arm and the right-upper rocker arm is provided with a ball-pin bracket connected with the ball-pin connecting rod.

4. The all-terrain vehicle according to claim 3, wherein each of the left-upper rocker arm and the right-upper rocker arm is a double wishbone, and the ball-pin bracket is located at a rear portion of the left-upper rocker arm and the right-upper rocker arm.

5. The all-terrain vehicle according to claim 1, wherein the buffer sleeve comprises two semicircular buffer blocks arranged opposite to each other, and end portions of the two buffer blocks are inserted and fitted with each other.

6. The all-terrain vehicle according to claim 5, wherein convex posts and grooves are provided at the end portions of the two buffer blocks, the convex post of one buffer block is fitted in the groove of the other buffer block.

7. The all-terrain vehicle according to claim 5, wherein fitting end faces of the two buffer blocks are in a horizontal direction, and fitting end faces between the mounting base and the stabilizer bar bracket are in a vertical direction.

8. The all-terrain vehicle according to claim 1, wherein the steering gear is located below a middle portion of the lateral stabilizer bar.

9. The all-terrain vehicle according to claim 1, wherein the frame comprises a front vertical beam, and a middle portion of the lateral stabilizer bar is mounted at the front vertical beam.

10. The all-terrain vehicle according to claim 9, wherein the steering gear is mounted on the front vertical beam.

11. The all-terrain vehicle according to claim 9, wherein two front vertical beams are provided, and the middle portion of the lateral stabilizer bar is mounted at the two front vertical beams.

12. The all-terrain vehicle according to claim 11, wherein the two front vertical beams are not parallel in the up-down direction, and a distance between the two front vertical beams gradually decreases from bottom to top.

13. The all-terrain vehicle according to claim 9, wherein the steering gear is located between the left-upper rocker arm as well as the right-upper rocker arm and the front vertical beam in a front-rear direction of the all-terrain vehicle, and a projection of the steering gear on a transverse central plane of the all-terrain vehicle coincides at least partially with a projection of the left-upper rocker arm and the right-upper rocker arm on the transverse central plane of the all-terrain vehicle.

14. The all-terrain vehicle according to claim 1, wherein a width of the left-upper rocker arm in a front-rear direction of the all-terrain vehicle is less than a width of the left-lower rocker arm in the front-rear direction of the all-terrain vehicle, and a width of the right-upper rocker arm in the front-rear direction of the all-terrain vehicle is less than a width of the right-lower rocker arm in the front-rear direction of the all-terrain vehicle.

15. The all-terrain vehicle according to claim 1, wherein the lateral stabilizer bar is a U-shaped bar.

16. The all-terrain vehicle according to claim 1, wherein a semicircular groove is defined in the mounting base, a semicircular groove is defined in the stabilizer bar bracket, and the two semicircular grooves jointly define a mounting space.

17. The all-terrain vehicle according to claim 1, wherein the forced filling oil cup passes through a middle portion of the mounting base and is communicated with the oil channel in the buffer sleeve after passing through the buffer sleeve.

\* \* \* \* \*